United States Patent Office 3,481,889
Patented Dec. 2, 1969

3,481,889
WATER BASE PAINTS
Kenneth F. Gibsen, San Diego, Calif., assignor to Kelco Company, San Diego, Calif., a corporation of Delaware
No Drawing. Continuation-in-part of application Ser. No. 308,683, Sept. 13, 1963, which is a continuation-in-part of application Ser. No. 148,696, Oct. 30, 1961. This application July 1, 1966, Ser. No. 562,092
Int. Cl. C09d 5/02, 3/10
U.S. Cl. 260—17.4                                       19 Claims

ABSTRACT OF THE DISCLOSURE

A dripless, water base paint containing a latex or rubber-like binder, a pigment, and an aqueous vehicle for the pigment and binder, said paint containing a small quantity of a xanthomonas hydrophilic colloid in an amount sufficient to give the paint the pseudoplastic properties. The paint, as defined, can also contain a small quantity of a water-soluble alginate in addition to the xanthomonas hydrophilic colloid. A process for forming a dripless, water base paint containing a latex base paint binder, a pigment, and an aqeous vehicle for the binder and pigment and including the formation of a pigment grind of the pigment in water prior to the addition of the latex binder, the process comprising adding a small quantity of a xanthomonas hydrophilic colloid to the pigment grind and thereafter grinding the pigment so as to reduce the time required to obtain optimum dispersion of the pigment.

---

This application is a continuation-in-part of my prior copending application Ser. No. 308,683, entitled "Water Base Paints," filed Sept. 13, 1963 and now abandoned, which is in turn a continuation-in-part of application Ser. No. 148,696 having the same title, filed Oct. 30, 1961 and now abandoned.

This invention relates to water base paints and more particularly to new and useful dripless water base paints having an advantageous pseudoplastic or thixotropic body.

In general, water base paints are aqueous emulsions or latex compositions containing a resinous film forming agent, and pigment. Such paints may, and usually do contain other ingredients such as extenders; anti-foaming agents; dispersion agents; freeze-thaw stabilizers; thickeners and preservatives.

In a water base paint, water takes the place of the thinner in the conventional oil base paint. When the paint is applied upon a surface in a thin film, water evaporates, and the resinous or rubber-like materials form a continuous film, where, by oxidation, polymerization, or other reaction, the film becomes water resistant.

The formulation of a water base paint is varied to suit the condition of use. For example, interior paints normally contain more pigment per weight of latex binder or resinous film forming agent than does an exterior paint. The said binder or film forming agents are rubber-like materials and as is disclosed in the paint technology literature may vary in composition. The following synthetic plastic semi-solids are particularly well known and are used as binders or film forming agents in commercial water base paint formulations: styrene-butadiene copolymers; polystyrene in both post and preplasticized systems, polyacrylate emulsions; and polyvinyl acetate emulsions. These synthetic water base paint binders are described as both emulsions and as synthetic latexes, the latex being preferred terminology. Natural latex, although disclosed in the literature as a binder or film forming agent in water base paints is not generally used.

Those skilled in the art of preparing water base paints appreciate the need for improvement in said paints in such important characteristics or properties as rollability or brushability while maintaining good anti-drip characteristics; relatively uniform viscosity under changing conditions of temperature and pH; good hiding power with non-sag characteristics; ease of manufacture; and particularly the need of a means of providing an improved water base paint composition having substantially all of the aforementioned desirable properties.

An object of this invention is to provide a method for producing a dripless water base paint of pseudoplastic properties which has a mayonnaise type body when observed at rest or near rest, and when subjected to high shearing effects present in rolling or brushing motion flows readily and spreads uniformly. This latter property makes for ease of handling, storage, and particularly application in overhead jobs and other situations where a highly liquid or free flowing paint is not desired.

It is an additional object of this invention to provide a water base paint formulation that is relatively stable to pH drift.

It is still another object of this invention to provide a water base paint formulation having good hiding power and non-sag characteristics.

A further object of this invention is to provide an improved process for making a paint having good hiding power and non-sag characteristics.

In accordance with my invention I have found that one or more of the foregoing objectives and particularly the production of a good dripless water base paint may be obtained by incorporating a relatively small amount of a Xanthomonas hydrophilic colloid in conventional water base paint formulations. Suitable amounts of such a colloid for my purpose are in the range of .01 to 3% by weight of the paint. Amounts in the range of .2 to .8% by weight of the said paint are preferred when using a Xanthomonas colloid produced by the bacterium *Xanthomonas campestris*.

As an example of my invention I incorporated a small amount of a hydrophilic colloid produced by the bacterium *Xanthomonas campestris* in a water base paint formulation. The water base paint so produced was improved in that the said colloid imparted a rheology that is non-Newtonian and very pseudoplastic, e.g., the apparent viscosity of the material is very much higher under low shear rates than at high shear rates. Still further, the paint so produced had a mayonnaise type of body when observed at rest or near rest in the can or on the brush. This property made the paint resistant to dripping from the brush and splashing from the can. However, when I subjected the water base paint made in accordance with my invention to the higher shearing effects present from a rolling or brushing motion, the consistency of the paint changed drastically and it flowed readily.

In the aforementioned example of my invention employing a Xanthomonas hydrophilic colloid, I refer to such a colloid produced by the bacterium *Xanthomonas campestris*. This colloidal material is a polymer containing mannose, glucose, potassium glucuronate and acetyl radicals. In such a colloid, the potassium portion can be replaced by several other cations without substantial change in the property of the said material for my purpose. The said colloid, which is a high molecular weight, exocellular material, may be prepared by the bacterium *Xanthomonas campestris*, by whole culture fermentation of a medium containing 2–5% commercial glucose, organic nitrogen source, dipotassium hydrogen phosphate and appropriate trace elements. The incubation time is approximately 96 hours at 28° C., aerobic conditions. In preparing a Xanthomonas colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparing a *Xanthomonas campestris* hydrophilic colloid, a loopful of organism from the agar slant is adequate for the first stage comprising 200 milliliters of the said glucose media. In the second stage the material resulting from the first stage may be used together with 9 times its volume of a 3% glucose media. In the final stage the material produced in the second stage may be admixed with 19 times its volume of the final media. A good final media may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. The resulting *Xanthomonas campestris* colloidal material which I have found to be particularly suitable for my purpose can be recovered by precipitation in methanol of the clarified mixture from the fermentation. This resulting material may also be designated as a pseudoplastic, heteropolysaccharide hydrophilic colloid or gum produced by the bacterium species *Xanthomonas campestris.*

Other suitable Xanthomonas colloidal material may be prepared by repeating the procedure used for producing the *Xanthomonas campestris* colloidal material by substituting known Xanthomonas bacterium or organism, i.e., *Xanthomonas carotae, Xanthomonas incanae, Xanthomonas begoniae,* and *Xanthomonas mlvacearum,* for the bacterium, *Xanthomonas campestris.*

The following is an example of a typical paint formulation prepared in keeping with my invention in which I used a Xanthomonas colloidal material produced by the bacterium *Xanthomonas campestris.*

EXAMPLE I

I dissolved 5 parts of the *Xanthomonas campestris* colloid (prepared as described in the foregoing) in 230 parts of water. I then mixed in 3 parts of a dispersing agent, i.e., polyethylene glycol; 1½ parts of a wetting agent, i.e., alkyl phenoxy poly(ethene oxy) ethanol having approximately 63% combined ethylene oxide; 3 parts of an emulsifier, i.e., water dispersible Lecithin; 225 parts of titanium dioxide, a pigment, 100 parts of commercial clay sold as extenders for water base paint pigments. To the foregoing dispersion, I then added 12 parts of a 20% solution of a commercial preservative, sodium ortho phenylphenate (Dowicide A); 16 parts of diethylene glycol mono ethyl ether, and 16 parts of ethylene glycol. The last mentioned ether and glycol are known as freeze-thaw stabilizers. The resulting mixture was then admixed with 378 parts of a binder, a commercial polyvinyl acetate emulsion (Flexibond 800).

Like formulations to the above substituting the Xanthomonas colloidal material produced by the other aforementioned Xanthomonas bacteria, produce comparable water base paints. However, I varied the quantity of the Xanthomonas colloid depending upon the species thereof. More particularly, I found that when using a Xanthomonas colloid produced by the organism *Xanthomonas carotae,* I required 1.9 parts of said colloid as a substitute for each part of a colloid produced by the bacterium *Xanthomonas campestris.* Similarly, when substituting the colloid produced by the bacterium *Xanthomonas incanae,* 1.5 parts were required; when substituting *Xanthomonas begoniae,* 165 parts were required; and when substituting *Xanthomonas malvacearum,* 1.25 parts were required.

The water base paint prepared according to the above formulation was found to have good application characteristics when applied with both a roller and a brush. The paint was found to be relatively fluid during application and almost immediately thereafter set up to the extent that a dripless or non-fluid condition was produced. In addition, the said paint had excellent hiding power with a single coat and non-sag characteristics even on a vertical surface.

The basic ingredients in a water base paint formula, as exemplified by the formula in column 3 hereof, are the binder, i.e., the polyvinyl acetate emulsion, the pigment, i.e., titanium dioxide with the extender therefor, i.e., clay; and the pseudoplastic Xanthomonas colloid, while the other ingredients included in said formula for one or more purposes, such as dispersing agent, wetting agent, emulsifier, the freeze-thaw stabilizers and the preservative, are ingredients that may vary widely if used depending on the particular objective and choice of the manufacturer or user of my invention.

In column 1 hereof, reference is made to examples of latex binders used in water base paints.

In a preferred embodiment of my invention, the water base paint contains a Xanthomonas hydrophilic colloid, as defined previously, in admixture with a water-soluble alginate. Suitable alginates include, for example, sodium alginate, potassium alginate, and ammonium alginate. A particularly suitable alginate is a high viscosity finely divided sodium alginate sold under the trade name "Keltex P." Preferably, the alginate employed has a viscosity of about 500 to about 1500 cps., and more preferably, about 800 to about 1000 cps. in a 1% aqueous solution.

By employing a mixture of a Xanthomonas hydrophilic colloid and an alginate in a water base paint, I have found that the wet edge is increased and that the paint so produced has better flow and leveling properties. The relative quantities of a Xanthomonas hydrophilic colloid and a water-soluble alginate which are employed can, of course, be varied depending upon the properties desired in the paint. In general, however, I have found that satisfactory paints are obtained when using a weight ratio of Xanthomonas hydrophilic colloid to water-soluble alginate in the range of about 2 to 1 to about 3 to 1.

Surprisingly, I have found that the use of a water-soluble alginate in conjunction with a Xanthomonas hydrophilic colloid permits, in general, the use of a higher content of Xanthomonas hydrophilic colloid in the finished paint. In the case of a butadiene-styrene emulsion paint, I found that optimum paint qualities were obtainable by using in the order of 1 pound or less of a *Xanthomonas campestris* hydrophilic colloid per 100 gallons of paint. In contrast, when using a mixture of a *Xanthomonas campestris* hydrophilic colloid with finely divided high viscosity sodium alginate (Keltex P), I found that the properties of the finished paint could be improved by employing larger quantities of *Xanthomonas campestris* hydrophilic colloid, up to about 3 pounds per 100 gallons of the finished paint. The use of 2 pounds of a Xanthomonas hydrophilic colloid per 100 gallons of finished paint gave the optimum properties when the colloid was employed in conjunction with sodium alginate in the weight ratios specified above.

In forming a water base paint according to the present invention, it is advantageous to add at least a portion of the Xanthomonas hydrophilic colloid employed to the pigment grind. Customarily, the various pigments employed in the paint are ground in a suitable mixer, such as a Cowles Mixer, prior to the addition of the paint binder which is mixed in to form the finished paint. Surprisingly, the presence of the Xanthomonas hydrophilic colloid in the pigment grind has been found to assist greatly in the dispersing of the pigment. The concentration of the Xanthomonas hydrophilic colloid in the pigment grind is preferably kept to a maximum of about 1 pound per 100 gallons of the pigment grind.

Any additional Xanthomonas hydrophilic colloid employed in the paint (in addition to that which is added to the pigment grind) is preferably added to the paint in the form of an aqueous presolution in conjunction with any water-soluble alginate to be employed in the paint. The aqueous presolution is generally added prior to the addition of the paint binder in the compounding of the paint. This procedure provides better dispersion of the Xanthomonas hydrophilic colloid in the finished paint and provides paints having more uniform viscosity characterstics. After the presolution of Xanthomonas hydrophilic colloid has been blended into the pigment grind, the paint binder is then added and mixed in.

To further illustrate the scope of my invention, there are presented the following additional examples in which all parts and percentages are by weight unless otherwise indicated.

EXAMPLE II

To 186 pounds of water were added 0.25 pound of a paint preservative (Metasol 57) and 0.25 pound of sodium hexametaphosphate. Following this, 1.25 pounds of a finely divided high viscosity sodium alginate (Keltex P) was sifted in and the mixture was agitated for 5 minutes in a Cowles Mixer at dispersion speed. Two pounds of *Xanthomonas campestris* hydrophilic colloid was then added and the mixture was mixed for an additional 5 minutes in the Cowles Mixer.

There was then added to the mixer an additional 125 pounds of water, 27 pounds of ethylene glycol, and 2 pounds of a defoaming agent (Nopco 1719B). These ingredients were mixed in until uniformity was obtained and 150 pounds of a finely divided titanium dioxde pigment (TiPure R—901) was added. The mixture was then ground for 10 minutes in the Cowles Mixer and there was added 225 pounds of kaolin clay. One hundred pounds of the clay was of the type obtainable as "Hydrite Flat 'D' " and 125 pounds of the clay was the type obtainable as "Glomax LL." Also added was 100 pounds of a calcium carbonate pigment (Duramite). The mixture was then ground for an additional 10 minutes in the Cowles Mixer and there was added 2 pounds of a defoamer (Nopco 1719B), and 153 pounds of a presolution containing 1% by weight of a water-soluble high viscosity sodium alginate (Keltex P) and 3% of a *Xanthomonas campestris* hydrophilic colloid.

The presolution was made up previously by adding 0.5 pounds of a 30% solution of phenyl mercuric acetate to 960 pounds of water after which 10 pounds of finely divided high viscosity sodium alginate (Keltex P) was sifted in while agitating. Following ths, 30 pounds of finely dvided *Xanthomonas campestris* hydrophilic cooloid was added and mixed in until a smooth homogeneous solution was formed.

After the addition of the anti-foaming agent and the presolution of sodium alginate and *Xanthomoans campestris* hydrophilic colloid, mixing was continued until smooth after which 211 pounds of a styrene-butadiene latex emulsion (Gen-Flo 67) was added and mixed in. The resulting styrene-butadiene paint was subjected to a number of tests and found to be an excellent low cost styrene-butadiene dripless paint. No settling of pigment was observed after the paint had stood for three months at room temperature.

EXAMPLE III

A quality styrene-butadiene dripless paint was prepared by adding 0.25 pound of a paint preservative (Metasol 57) and 0.20 pound of sodium hexametaphosphate to 162 pounds of water. Following this, 1 pound of a finely divided sodium alginate (Keltex P) was sifted in and the mixture was agitated for 5 minutes in a Cowles Mixer at dispersion speed. Thereafter, 2 pounds of a *Xanthomonas campestris* hydrophilic colloid was added and mixing was continued for an additional 5 minutes. Following this, 112 pounds of water, 27 pounds of ethylene glycol, and 2 pounds of a defoaming agent (Nopco 1719B) were added and mixed in until uniform. There was then added 225 pounds of a titanium dioxide pigment (TiPure R–901) and 5 pounds of a finely divided pyrogenic silica (Cab-O-Sil M–5) and the mixture was ground for 10 minutes. There was then added 150 pounds of a kaolin clay (Glomax LL) and 100 pounds of a barium sulfate extender (Barytes 10–X–R). The mixture was then ground for an additional 10 minutes.

There was then added 2 pounds of an anti-foaming agent (Nopco 1719B) and 102 pounds of a presolution containing 1% by weight of a finely divided sodium alginate (Keltex P) and 3% of a *Xanthomonas campestris* hydrophilic colloid. The presolution had the same composition as described in Example II and was prepared in the same manner. Following this, mixing was continued until the composition was smooth after which the mixing speed was reduced and 297 pounds of a styrene-butadiene latex emulsion (Gen-Flo 67) was added and mixed in.

The resulting high quality styrene-butadiene paint was subjected to a number of tests and found to have excellent properties as required for a dripless water base paint. No settling of pigment was observed after standing of the paint for three months at room temperature.

EXAMPLE IV

A low cost vinyl acetate paint was prepared by adding 1 pound of phenyl mercuric oleate (Nildew OL–30) and 0.25 pound of sodium hexametaphosphate to 206 pounds of water. Following this, 1.25 pounds of a finely divided sodium alginate (Keltex P) was sifted in and the mixture was agitated for 5 minutes in a Cowles Mixer at dispersion speed. Two pounds of a *Xanthomonas campestris* hydrophilic colloid was then added and mixing was continued for an additional 5 minutes.

There was then added 145 pounds of water, 20 pounds of hexylene glycol, and 2 pounds of a defoaming agent (Nopco NXZ). Mixing was continued until uniform and there was added 150 pounds of a finely divided titanium dioxide pigment (TiPure R–901). The mixture was then ground for 10 minutes after which 150 pounds of a kaolin clay (Hydrite Flat "D"), 125 pounds of a kaolin clay (Glomax LL) and 100 pounds of a calcium carbonate pigment (Duramite) were added. The mixture was ground for an additional 10 minutes and 2 pounds of a defoaming agent (Nopco NXZ), 15 pounds of ethylene glycol butyl ether acetate (Butyl Cellosolve Acetate), and 98 pounds of a presolution containing 1% of a finely divided sodium alginate (Keltex P) and 3% by weight of a finely divided *Xanthomonas campestris* hydrophilic colloid were added. The presolution employed had the same composition as in the previous examples. Mixing was continued until the mixture became smooth after which the mixing speed was reduced and there was added and mixed in 213 pounds of a polyvinyl acetate latex emulsion (Resyn 12K55). The resulting paint was subjected to a variety of tests and found to have the properties required for a suitable low cost vinyl acetate dripless paint.

EXAMPLE V

A quality vinyl acetate dripless paint was prepared by adding 1 pound of phenyl mercuric oleate (Nildew OL–30) and 0.25 pound of sodium hexametaphosphate to 186 pounds of water. 1.25 pounds of a finely divided sodium alginate (Keltex P) was sifted in and the mixture was agitated for 5 minutes in a Cowles Mixer at dispersion speed. Subsequently, 2 pounds of a *Xanthomonas campestris* hydrophilic colloid was added and mixing was continued for an additional 5 minutes.

There was then added 116 pounds of water, 20 pounds of hexylene glycol, and 2 pounds of a non-ionic metallic soap emulsion (Colloid 581B). Mixing was continued until uniform and there was added 220 pounds of a finely divided titanium dioxide pigment (TiPure R–901) and 5 pounds of a finely divided pyrogenic silica (Cab-O-Sil M–5). The mixture was ground for 10 minutes and there was added 150 pounds of a kaolin clay (Glomax LL) and 100 pounds of a barium sulfate extender (Barytes 10–X–R). Grinding was continued for an additional 10 minutes and there was added 2 pounds of a nonionic metallic soap emulsion (Colloid 581 B), 15 pounds of ethylene glycol butyl ether acetate (Butyl Cellosolve Acetate), and 72 pounds of a presolution containing 1% of a finely divided sodium alginate and 3% of a *Xanthomonas campestris* hydrophilic colloid, as described in the preceding examples. Mixing was continued until smooth after which the speed was reduced and there was added and mixed in 340 pounds of a polyvinyl acetate latex emulsion (Resyn 12 K–55).

The resulting high quality vinyl acetate dripless paint was subjected to a variety of tests including washability, scrubbability, brushing, flow and leveling, tintability, tint uniformity over surfaces of varying porosity, pigment settling, 60° glos, contrast ratio, reflectance, freeze-thaw stability, etc. These tests were the same as those employed for the paints of the preceding examples. The high quality vinyl acetate dripless paint passed all of the tests and proved to be an excellent dripless paint.

EXAMPLE VI

A low cost acrylic dripless paint was prepared by adding 0.25 pound of a paint preservative (Metasol 57) and 0.25 pound of sodium hexametaphosphate to 186 pounds of water. Following this, 1.25 pounds of a finely divided sodium alginate (Keltex P) was sifted in and the mixture was agitated for 5 minutes in a Cowles Mixer at dispersion speed. Two pounds of a finely divided *Xanthomonas campestris* hydrophilic colloid was then added and mixing was continued for an additional 5 minutes.

There was then added 125 pounds of water, 34 pounds of propylene glycol, and 2 pounds of a defoaming agent (Nopco NXZ). Mixing was continued until uniform and there was then added 150 pounds of finely divided titanium dioxide pigment (TiPure R–901). The mixture was then ground for 10 minutes and there was added 150 pounds of a kaolin clay (Hydrite Flat "D"), 125 pounds of gaolin clay (Glomax LL), and 100 pounds of a calcium carbonate pigment (Duramite). The mixture was ground for an additional 10 minutes and there was added 2 pounds of a defoaming agent (Nopco NXZ), and 93 pounds of a presolution containing 1% of a finely divided sodium alginate (Keltex P) and 3% of finely divided *Xanthomonas campestris* hydrophilic colloid. The presolution had the composition and was prepared in the manner described in the preceding examples. Following this, the mixture was mixed until smooth after which the speed was reduced and there was added and mixed in 239 pounds of an acrylic latex emulsion (Rhoplex AC–22).

The resulting paint was subjected to a variety of tests of the type described in the previous examples and was found to be an excellent low cost acrylic base dripless paint.

EXAMPLE VII

A quality acrylic dripless paint was prepared by adding 0.25 pound of a paint preservative (Metasol 57), and 0.10 pound of sodium hexametaphosphate to 125 pounds of water. There was then sifted in 0.50 pound of a finely divided sodium alginate (Keltex P) and the mixture was agitated for 5 minutes in a Cowles Mixer at dispersion speed. Following this, 2 pounds of finely divided *Xanthomonas campestris* hydrophilic colloid was added and mixing was continued for an additional 5 minutes.

There was then added 100 pounds of water and 2 pounds of an anti-foaming agent (Nopco NXZ). Mixing was continued until uniform after which there was added 225 pounds of finely divided titanium dioxide pigment (TiPure R–901) and 5 pounds of a finely divided pyrogenic silica (Cab-O-Sil M–5). The mixture was then ground for 10 minutes and there was added 135 pounds of a kaolin clay (Glomax LL) and 120 pounds of a barium sulfate extender (Barytes 10–X–R). The mixture was ground for another 10 minutes after which there was added 2 pounds of an anti-foaming agent (Nopco NXZ), 26 pounds of propylene glycol and 110 pounds of a presolution containing 1% by weight of a finely divided sodium alginate and 3% by weight of *Xanthomonas campestris* hydrophilic colloid (the content of the presolution and its mode of preparation is described in the previous examples). Mixing was continued until smooth after which there was added and mixed in 350 pounds of an acrylic latex emulsion (Rhoplex AC–22).

The resulting paint was subjected to a variety of tests of the type described in the previous examples and found to be an excellent high quality acrylic dripless paint.

EXAMPLE VIII

A low cost vinyl-acrylic dripless paint was prepared by adding 1 pound of phenyl mercuric oleate (Nildew OL–30) and 0.25 pound of sodium hexametaphosphate to 201 pounds of water. There was then sifted in 1.25 pounds of a finely divided sodium alginate (Keltex P) and agitation was continued for 5 minutes in a Cowles Mixer at dispersion speed. Following this, there was added 2 pounds of finely divided *Xanthomonas campestris* hydrophilic colloid and mixing was continued for an additional 5 minutes.

There was then added 140 pounds of water, 15 pounds (Nopco 1719B). Mixing was continued until uniform and there was added 150 pounds of a finely divided titanium dioxide pigment (TiPure R–901). The mixture was then ground for 10 minutes and there was added 125 pounds of a kaolin clay (Hydrite Flat "D"), 125 pounds of a kaoline clay (Glomax LL), and 100 pounds of calcium carbonate pigment (Duramite). The mixture was ground for an additional 10 minutes and there was added 2 pounds of an anti-foaming agent (Nopco 1719B), 13 pounds of ethylene glycol butyl ether acetate (Butyl Cellosolve Acetate), and 120 pounds of a presolution containing 1% by weight of a finely divided sodium alginate and 3% by weight of *Xanthomonas campestris* hydrophilic colloid. The presolution had the same composition and was prepared in the same manner as described in the previous examples. Mixing was continued until smooth, the speed was reduced and there was added and mixed in 191 pounds of a vinyl-acrylic copolymer latex emulsion (CL–222).

The resulting paint was subjected to a variety of tests of the type referred to in the previous examples and found to be an excellent low cost vinyl-acrylic dripless paint.

EXAMPLE IX

A quality vinyl-acrylic dripless paint was prepared by adding 0.25 pound of a paint preservative (Metasol 57) and 0.25 pound of sodium hexametaphosphate to 186 pounds of water. There was then sifted in 1.25 pounds of a finely divided sodium alginate (Keltex P) and the mixture was agitated for 5 minutes in a Cowles Mixer at dispersion speed. Following this, 2 pounds of finely divided *Xanthomonas campestris* hydrophilic colloid was added and mixing was continued for an additional 5 minutes.

There was then added 125 pounds of water, 2 pounds of an anti-foaming agent (Nopco NDW Company), and 25 pounds of hexylene glycol. Mixing was continued until the mixture was uniform. There was then added 225 pounds of finely divided titanium dioxide pigment (TiPure R–901) and 5 pounds of a finely divided pyrogenic silica (Cab-O-Sil M–5). The mixture was ground for 10 minutes and there was added 125 pounds of a kaoline clay (Glomax LL) and 120 pounds of a calcium carbonate pigment (Barytes N–X–R). The mixture was ground for an additional 10 minutes and there was then added 2 pounds of an anti-foaming agent (Nopco NDW), 13 pounds of ethylene glycol butyl ether acetate (Butyl Cellosolve Acetate), and 93 pounds of a presolution containing 1% by weight of a finely divided sodium alginate and 3% by weight of finely divided *Xanthomonas campestris* hydrophilic colloid. The presolution had the same composition and was prepared in the same manner described in the preceding examples.

Mixing was continued until smooth after which the speed was reduced and there was added and mixed in 291 pounds of a vinyl acrylic copolymer latex emulsion (CL–222). The resulting paint was subjected to a variety of tests, as referred to in the preceding examples, and found to be en excellent vinyl-acrylic dripless paint.

In the foregoing, I have referred to titanium dioxide as a water base paint pigment. Other pigments, such as lithopone, zinc oxide, and the like are also used and usually in combination with extenders such as mica, talc, china clay, barium sulphate, calcium carbonate, dolomite, calcium silicate, silica, and diatomaceous earth. To such pigment, colors may be added such as organic pigments, iron oxide, chromic oxide, carbon black sienna, umber, and ochre.

Water base paints may also include quite a variety of wetting or dispersing agents such as polyphosphates, pyrophosphates, anionic and non-ionic surfactants, polyacrylates, polymethacrylates, polyvinyl alcohol, polyethyleneglycol. Additional ingredients include freeze-thaw stabilizers such as ethylene glycol, diethylene glycol, and nonionic surfactants; and preservatives such as organomercuric and organo-tin compounds, alkylated, halogenated or arylated phenols and their derivatives, antibiotics and many others. Still other ingredients may be included in water base paint formulas such as materials known as foam breakers, e.g., silicones, ditertiary acetylenic glycols, long chain ethylene oxide condensates, tributyl phosphate, pine oil, and higher aliphatic alcohols. Water base paints, including a pseudoplastic Xanthomonas colloid in accordance with my invention, to impart the novel properties hereinbefore described, may also include such materials as starch, casein, methyl cellulose, hydroxy ethyl cellulose, vegetable gum, and the like.

In preparing a water base paint, a factor that is considered is the pigment (pigment plus the extender, if any) volume concentration, i.e., the concentration by volume of the pigment expressed as a percentage of the total nonvolatile volume of the paint. Stated otherwise the volume concentration is the combination of the pigment plus the binder. A large portion of the volume concentration in a water base paint is the pigment and extender. The percentage of pigment and extender in the volume concentration will vary depending upon the use to which the paint is to be put. Thus, for example, in a flat paint the said pigment including extender will usually be in the range of 50% or 70%; in a semi-gloss paint, 35% or 50%; and in a gloss paint, 20–40%. As aforementioned, the balance of the make-up of the volume concentration is the binder and accordingly in a gloss paint there would be the largest percentage of binder; in a semi-gloss a smaller amount of binder; and in a flat paint, a still smaller amount of binder. The water content of a water base paint varies widely depending on the other ingredients therein and intended use of the paint. For example, water may be present in an amount from 20% to 60% of the weight of the finished paint.

The addition of a Xanthomonas hydrophilic colloid to the pigment grind, as mentioned previously, has been found to assist greatly in the dispersing of the pigment. To illustrate, it was found that the addition of the Xanthomonas hydrophilic colloid to the pigment grind reduces the time required to obtain optimum dispersion by as much as 30% or more.

Moreover, the dispersing characteristics of the Xanthomonas hydrophilic colloid permit the formulation of paints according to my invention while using substantially less or no surfacant as is required generally in paints to disperse the pigment. Through reduction of the surfactant content, paints can be produced which have improved resistance to weathering.

When using a water-soluble alginate in my paints, it is frequently desirable to employ also a sequestering agent such as a molecularly dehydrated phosphate salt, e.g., sodium hexametaphopshate, tetrasodium pyrophosphate, sodium tripolyphosphate, and the similiar potassium phosphates. The sequestering agent can be employed in varying minor amounts depending on the hardness of the water used in making the paint so as to prevent precipitation of the water-soluble alginate. Frequently, it is desirable, as shown in the foregoing examples to add the sequestering agent to the pigment grind.

I claim:

1. A dripless water base paint comprising a synthetic latex water base paint binder, a pigment, an aqueous vehicle for said binder and pigment, and containing a small quantity of a pseudoplastic heteropolysaccharide hydrophilic colloid produced by a Xanthomonas bacterium, said quantity of said colloid being present in an amount sufficient to give the said paint pseudoplastic properties.

2. A dripless water base paint comprising a synthetic latex water base paint binder, a pigment, an aqueous vehicle for said binder and pigment and containing a quantity from 0.01 to 3% by weight of the paint of a pseudoplastic heteropolysaccharide hydrophilic colloid produced by a Xanthomonas bacterium, said quantity of said colloid being present in an amount sufficient to give the said paint pseudoplastic properties.

3. A dripless water base paint comprising a synthetic latex water base paint binder, a pigment, an aqueous vehicle for said binder and pigment and containing a quantity from 0.2 to 0.8% by weight of the paint of a pseudoplastic heteropolysaccharide hydrophilic colloid produced by the bacterium *Xanthomonas campestris,* said quantity of said colloid being present in an amount sufficient to give the said paint pseudoplastic properties.

4. A dripless water base paint comprising a synthetic latex water base paint binder, a pigment including an extender therefor, a small quantity of a water base paint preservative, a small amount of a water base paint freeze-thaw stabilizer, an aqueous vehicle for the aforesaid ingredients and containing a quantity from 0.01 to 3% by weight of the paint of a psneudoplastic heteropolysaccharide hydrophilic colloid produced by the bacterium *Xanthomonas compestris,* said quantity of said colloid being present in an amount sufficient to give the said paint pseudoplastic properties.

5. A dripless water base paint comprising a synthetic latex water base paint binder, a pigment, an aqueous vehicle for said binder and pigment and containing a small quantity of a pseudoplastic heteropolysaccharide hydrophilic colloid produced by the bacterium *Xanthomonas campestris,* said quantity of said colloid being present in an amount sufficient to give the said paint pseudoplastic properties.

6. A dripless water base paint comprising a synthetic latex water base paint binder, a pigment, an aqueous vehicle for said binder and pigment, and containing a small quantity of a water-soluble alginate and a pseudoplastic heteropolysaccharide hydrophilic colloid produced by a Xanthomonas bacterium, said hydrophilic colloid being present in an amount sufficient to give the said paint pseudoplastic properties.

7. The dripless water base paint of claim 6 wherein the weight ratio of said pseudoplastic heteroploysaccharide hydrophilic colloid to said water-soluble alginate ranges from about 2 to 1 to about 3 to 1.

8. In a process for forming a dripless water base paint comprising a synthetic latex water base paint binder, a pigment, and an aqueous vehicle for said binder and pigment and including forming a pigment grind of said pigment and water prior to addition of said latex binder, the improvement comprising adding a small quantity of a pseudoplastic heteropolysaccharide hydrophilic colloid produced by a Xanthomonas bacterium to said pigment grind and thereafter grinding said pigment, whereby the time required to obtain optimum dispersion of the pigment is reduced.

9. The process improvement of claim 8 wherein the quantity of pseudoplastic heteropolysaccharide hydrophilic colloid added to the said pigment grind ranges up to about 1 pound per 100 gallons of said pigment grind.

10. The process improvement of claim 8 wherein said pseudoplastic heteropolysaccharide hydrophilic colloid is produced by the bacterium *Xanthomonas campestris*.

11. The process improvement of claim 8, including the step of adding to said pigment grind a finely divided water soluble alginate.

12. A process for forming a dripless water base paint, said process comprising admixing a synthetic latex water base paint binder, a pigment, an aqueous vehicle for said binder and pigment, a water-soluble alginate, and a pseudoplastic heteropolysaccharide hydrophilic colloid produced by a Xanthomonas bacterium, the concentration of said hydrophilic colloid ranging up to about 3 pounds per 100 gallons of said paint.

13. A process of preparing a dripless water base paint, said process comprising mixing a pigment, an aqueous vehicle, and a pseudoplastic heteropolysaccharide hydrophilic colloid produced by a Xanthomonas bacterium to form a pigment grind, grinding said pigment grind, and mixing into said pigment grind a synthetic latex water base paint binder.

14. The process of claim 13 including the step of adding a water-soluble alginate, the quantity of said pseudoplastic heteropolysaccharide hydrophilic colloid ranging up to about 3 pounds per 100 gallons of paint.

15. The process of claim 14 wherein a portion of said hydrophilic colloid and a portion of said alginate are added to said pigment grind and the remainder of said hydrophilic colloid and said soluble alginate are added in the form of an aqueous presolution immediately prior to addition of said synthetic latex water base paint binder.

16. The process of claim 15 wherein said hydrophilic colloid is produced by the bacterium *Xanthomonas campestris*.

17. A dripless water base paint comprising a rubber-like water base paint binder, a pigment, and an aqueous vehicle for said binder and pigment, said paint containing a small quantity of a hydrophilic colloid produced by a Xanthomonas bacterium, said colloid being present in an amount sufficient to give the said paint pseudoplastic properties.

18. The dripless water base paint of claim 17 wherein said Xanthomonas hydrophilic colloid is produced by the bacterium *Xanthomonas campestris*.

19. The dripless water base paint of claim 17 wherein said colloid is present in an amount from 0.2 to 0.8% by weight of the paint.

References Cited

UNITED STATES PATENTS

| | | | |
|---|---|---|---|
| 2,211,912 | 8/1940 | Ryan | 260—33.6 |
| 3,000,790 | 9/1961 | Jeanes et al. | 195—31 |
| 3,067,053 | 12/1962 | Tarantino | 106—308 |
| 3,232,929 | 2/1966 | McNeely et al. | 260—209 |
| 2,456,295 | 12/1948 | Mast | 260—17.4 |
| 2,854,421 | 9/1958 | Wenzelberger | 260—17.4 |
| 2,956,973 | 10/1960 | Holdsworth | 260—17.4 |
| 3,020,206 | 2/1962 | Patton et al. | 260—17.4 |

WILLIAM H. SHORT, Primary Examiner

E. NIELSEN, Assistant Examiner

U.S. Cl. X.R.

117—161, 165; 260—29.6